(12) United States Patent
Berseth et al.

(10) Patent No.: US 10,528,807 B2
(45) Date of Patent: Jan. 7, 2020

(54) SYSTEM AND METHOD FOR PROCESSING AND IDENTIFYING CONTENT IN FORM DOCUMENTS

(71) Applicant: Scribe Fusion, LLC, Jacksonville, FL (US)

(72) Inventors: Matthew Thomas Berseth, Ponte Vedra, FL (US); Robert Jackson Marsh, Ponte Vedra Beach, FL (US)

(*) Notice: Subject to any disclaimer, the term of this patent is extended or adjusted under 35 U.S.C. 154(b) by 0 days.

(21) Appl. No.: 16/383,496

(22) Filed: Apr. 12, 2019

(65) Prior Publication Data
US 2019/0340429 A1 Nov. 7, 2019

Related U.S. Application Data

(60) Provisional application No. 62/665,196, filed on May 1, 2018.

(51) Int. Cl.
*G06K 9/00* (2006.01)
*G06F 16/22* (2019.01)
*G06F 16/28* (2019.01)
*G06T 7/194* (2017.01)
*G06T 7/11* (2017.01)
(Continued)

(52) U.S. Cl.
CPC ......... *G06K 9/00449* (2013.01); *G06F 16/22* (2019.01); *G06F 16/285* (2019.01); *G06K 9/00463* (2013.01); *G06K 9/54* (2013.01); *G06T 5/005* (2013.01); *G06T 7/11* (2017.01); *G06T 7/194* (2017.01); *G06K 2209/01* (2013.01); *G06T 2207/30176* (2013.01)

(58) Field of Classification Search
CPC ... G06F 16/22; G06F 16/285; G06K 9/00463; G06T 5/005
See application file for complete search history.

(56) References Cited

U.S. PATENT DOCUMENTS 5,933,531 A * 8/1999 Lorie .................... G06K 9/033
345/108
6,442,555 B1 * 8/2002 Shmueli ............. G06K 9/00463
(Continued)

OTHER PUBLICATIONS

Yefeng Zheng, Huiping Li, David Doermann, A Model-based Line Detection Algorithm in Documents, Proceedings of the Seventh International Conference on Document Analysis and Recognition, 2003, pp. 44-48, Proceedings, IEEE, USA.
(Continued)

*Primary Examiner* — Santiago Garcia
(74) *Attorney, Agent, or Firm* — Wilson Dutra, PLLC; Camille A. Wilson (57) ABSTRACT

The present disclosure generally provides a system and method for processing and identifying data in form. The system and method may distinguish between content data and background data in a form. In some aspects, the content data or background data may be removed, wherein the remaining data may be processed separately. Removal of the background data or the content data may allow for more effective or efficient character recognition of the data. In some embodiments, data may be processed on an element basis, wherein each element of the form may be labeled as background data, content data, noise, or combinations thereof. This system and method may significantly increase the ability to capture and extract relevant information from a form.

19 Claims, 10 Drawing Sheets

(51) Int. Cl.
*G06T 5/00* (2006.01)
*G06K 9/54* (2006.01)

(56) References Cited

U.S. PATENT DOCUMENTS

| | | | | |
|---|---|---|---|---|
| 7,561,734 B1* | 7/2009 | Wnek | ................... | G06F 17/243 |
| | | | | 382/159 |
| 7,685,522 B1* | 3/2010 | Feuerman | ............. | G06F 17/243 |
| | | | | 715/202 |
| 8,831,329 B1* | 9/2014 | Kumar | .................... | G06K 9/18 |
| | | | | 382/139 |
| 2006/0017752 A1* | 1/2006 | Kurzweil | ............... | G06K 9/228 |
| | | | | 345/698 |
| 2006/0182339 A1* | 8/2006 | Connell | ................... | G06K 9/38 |
| | | | | 382/170 |
| 2010/0331043 A1* | 12/2010 | Chapman | ............... | G01C 21/20 |
| | | | | 455/556.1 |
| 2014/0030686 A1* | 1/2014 | Stambaugh | ............. | G09B 7/06 |
| | | | | 434/322 |
| 2014/0064618 A1* | 3/2014 | Janssen, Jr. | ........ | G06K 9/00469 |
| | | | | 382/182 |
| 2014/0185909 A1* | 7/2014 | Penna | ...................... | G06K 9/38 |
| | | | | 382/138 |
| 2015/0049949 A1* | 2/2015 | Simske | .................... | G06K 9/03 |
| | | | | 382/182 |
| 2016/0048936 A1* | 2/2016 | Perkowski | ........... | G06Q 10/063 |
| | | | | 705/310 |
| 2016/0217119 A1* | 7/2016 | Dakin | ................... | G06F 17/276 |
| 2018/0232888 A1* | 8/2018 | Thevenet | ................ | G06T 7/194 |
| 2019/0056897 A1* | 2/2019 | Balinsky | ................... | H04L 9/30 |
| 2019/0228276 A1* | 7/2019 | Lei | ....................... | G06K 9/6261 |

OTHER PUBLICATIONS

Bin Yu, Anil K Jain, A generic system for form dropout, IEEE Transactions on Pattern Analysis and Machine Intelligence, Nov. 1996, pp. 1127-1134, 18(11), IEEE, USA.

* cited by examiner

| 3 Social security wages | 4 Social security tax withheld |
|---|---|
| 4862h99 | |
| 5 Medicare wages and tips | 6 Medicare tax withheld |
| | 298c 394 |
| 7 Social security tips | 8 Allocated tips |
| Sk289 | |
| 9 Advance EIC payment | 10 Dependent care benefits |
| | 2398y4no for box 12 |
| 11 Nonqualified plans | 12a See instructions for box 12 |
| | 12b 8s9 2347 |
| 13 Statutory employee / Retirement plan / Third-party sick pay | 12c 127s s09d |
| | 12d |
| 14 Other X | |
| Akkdf 22okcla | |
| Sldkc bslkncoo2873 | |

FIG. 7E (750)

| 3 Social security wages | 4 Social security tax withheld |
|---|---|
| 4862h99 | |
| 5 Medicare wages and tips | 6 Medicare tax withheld |
| | 298c 394 |
| 7 Social security tips | 8 Allocated tips |
| Sk289 | |
| 9 Advance EIC payment | 10 Dependent care benefits |
| | 2398y4no |
| 11 Nonqualified plans | 12a See instructions for box 12 |
| | 12b 8s9 2347 |
| 13 Statutory employee X / Retirement plan X / Third-party sick pay | 12c 127s s09d |
| | 12d |
| 14 Other | |
| Akkdf 22okcla | |
| Sldkc bslkncoo2873 | |

FIG. 8

SYSTEM AND METHOD FOR PROCESSING AND IDENTIFYING CONTENT IN FORM DOCUMENTS

CROSS-REFERENCE TO RELATED APPLICATION

This application claims priority to and the full benefit of U.S. Provisional Patent Application Ser. No. 62/665,196, filed May 1, 2018, and titled "SYSTEM AND METHOD FOR PROCESSING AND IDENTIFYING CONTENT IN FORM DOCUMENTS", the entire contents of which are incorporated in this application by reference.

BACKGROUND OF THE DISCLOSURE

Certain industries, such as the real estate, retail, healthcare, finance, and logistics industries, generate millions of records daily, either through paper-based transactions, using standardized forms, or other documents. Employees expend significant manual labor to enter or update whatever information they are given into a computer system in a process called data entry. Given the volume of information a company receives, data entry can be a core part of the business. In retail, for example, a store may want to expedite the process of updating its product entry systems to know exactly what they can sell when they receive a shipment. Sometimes this depends on individualized entry or input after a person verifies each product received. By way of another example, in the healthcare industry, insurance companies may depend on the data entry of several medical insurance billing forms to determine what they are paying out at any particular time. In this particular case, often the employees are keying the data from an image of the source document adding additional complexity to the process.

Given the volume of records generated at any time, coupled with the need to track said records, there is an incredible need to eliminate or reduce as many errors as possible during data entry itself. These errors can range from human error resulting from fatigue such as unclear data entry to incomplete forms that do not provide all of the necessary data. In addition, errors can occur due to the low quality of the source document image, including but not limited to; scanning artifacts, printing on lines, or printing outside of target boxes. As errors continue, and as records continue to pile in, it becomes increasingly difficult to locate exactly where in the chain something went wrong, how to locate a record again, or where and how the issue originated.

To partially solve this data capture issue, optical character recognition/intelligent character recognition (OCR/ICR) is the electronic conversion of images of handwritten, printed, or typed text into machine-encoded text. This enables other machines or programs to read inputs from scanned documents, photographs, or text superimposed on an image. OCR/ICR enables the digitization of text so that it can be electronically edited or searched. Data entry processes have employed OCR/ICR to help read or store paper data records, normally for printouts of static data such as invoices, receipts, statements, or forms.

However, many documents are scanned and saved as an image. Standard OCR/ICR techniques struggle with these documents and can have a high failure conversion rate, particularly to when the images of the documents are warped or distorted in some way. A form may have both typed and handwritten information on it, which may make it difficult for OCR/ICR to differentiate between the two. Some documents may have been faxed, scanned, or scanned after being faxed before OCR/ICR was applied, leading to mixed results when recognizing the information in a document. For example, some field labels, lines, or shading may cause interference that OCR/ICR may not be able to interpret. This necessitates human data entry to manually extract this text.

Despite some advancements in OCR/ICR technology, OCR/ICR recognition rates have not increased to a rate where human intervention is not required. One of the key challenges is that document image quality levels vary across sources and time. To overcome issues like these, there is a need to properly prepare a document for OCR/ICR. Properly prepared documents may increase OCR/ICR effectiveness thus reducing the need for human intervention.

SUMMARY OF THE DISCLOSURE

What is needed is a system and method for processing content in documents. The system and method may prepare a document before OCR/ICR is used to produce more accurate results in OCR/ICR. The system and method may also recognize what information is central to a given document or form and feed that information into the OCR/ICR system. This system and method may significantly increase the ability to consistently capture and extract relevant information from a form.

In some embodiments, this system and method may remove any form elements, such as background elements, even if the form is in black and white. In some implementations, this system and method may remove distortions from scanned images. In some aspects, this system and method may be applied to images from paper, screens, video, or photographs. By masking blocks within documents, leaving only the characters, the identified characters may be extracted into another system by standard OCR/ICR applications. In some embodiments, artificial intelligence may be used to mask the boxes within the forms. In some aspects, a machine learning model may be used to estimate the probability as to whether a given pixel should be removed or if the pixel needs to remain. In some implementations, a neural network may be trained to identify what content to mask and what content to extract.

In some aspects, the present disclosure relates to a process for processing and identifying content in a form, the process comprising the steps of: receiving a form set comprising a plurality of data sets, wherein each of the plurality of data sets may populate at least a first form in the form set; processing at least a portion of the form set and a portion of the plurality of data sets that populate the portion of the form set through a first artificial entity; and identifying one or more noise, background data, and content data for each form in the portion of the form set and the portion of the plurality of data sets.

Implementations may comprise one or more of the following features. In some aspects, the process may comprise the steps of: segmenting each form in the portion of the form set, wherein the identifying may occur for each segment; and reassembling each form in the portion of the form set. In some embodiments, the plurality of data sets may comprise one or both synthetic data and authentic data. In some implementations, the form set may comprise one or both synthetic forms and authentic forms. In some aspects, the form set may comprise a plurality of form types, and the process further may comprise identifying a plurality of form types for at least the portion of the form set.

In some embodiments, each form in the form set and each data set in the plurality of data sets may comprise a plurality of elements, and wherein the identifying labels each element of the portion of the form set and the portion of the plurality of data sets with one or more of noise, background data, or content data. In some implementations, the process may further comprise the process step of inpainting missing elements, wherein the inpainting increases a legibility of one or both background data or content data.

In some aspects, the process may further comprise the step of removing the content data for each form in the portion of the form set and the portion of the plurality of data sets. In some embodiments, removing the content data may prepare each form in the portion of the form set and the portion of the plurality of data sets for recognition of the background data. In some aspects, removing may occur through a second artificial entity.

In some implementations, the process may further comprise the step of removing the background data for each form in the portion of the form set and the portion of the plurality of data sets. In some embodiments, removing the background data may prepare each form in the portion of the form set and the portion of the plurality of data sets for recognition of the content data. In some aspects, the removing may occur through a second artificial entity.

In some embodiments, the process may further comprise the process step of categorizing at least a portion of the content data. In some implementations, the categorizing may occur through a second artificial entity. In some aspects, categorizing may create separable layers that, when separate, allows for increased recognition of at least a portion of the content data.

In some embodiments, at least some of one or both the background data and the form set may be indexed, wherein indexing associates at least one form type with the portion of one or both the background data and the form set. In some aspects, the process may further comprise the process step of indexing a first portion of one or both the background data and the form set. In some implementations, the indexing may occur through a second artificial entity. In some embodiments, the indexing may occur through the first artificial entity. Implementations of the described techniques may comprise hardware, a method or process, or computer software on a computer-accessible medium.

A system of one or more computers may be configured to perform particular operations or actions by virtue of having software, firmware, hardware, or a combination of them installed on the system that in operation may cause the system to perform the actions. One or more computer programs may be configured to perform particular operations or actions by virtue of including instructions that, when executed by data processing apparatus, may cause the apparatus to perform the actions. In some aspects, corresponding computer systems, apparatus, and computer programs recorded on one or more computer storage devices, may be configured to perform the actions of the methods.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure:

FIG. 7D illustrates an exemplary original form segment, according to some embodiments of the present invention.

FIG. 7E illustrates an exemplary reassembled form segment, according to some embodiments of the present invention.

DETAILED DESCRIPTION

The present disclosure provides generally for a system and method for processing and identifying content in documents. The system and method may prepare a document before OCR/ICR is used to produce more consistent results in OCR/ICR. The system and method may also recognize what information is central to a given document or form and feed that information into the OCR/ICR system.

In some embodiments, this system and method may remove any form elements, such as background elements, even if the form is in black and white. In some implementations, this system and method may remove distortions from scanned images. In some aspects, this system and method may be applied to images from paper, screens, video, or photographs. By masking blocks within documents, leaving only the characters, the identified characters may be extracted into another system by standard OCR/ICR applications. In some embodiments, artificial intelligence may be used to mask the boxes within the forms. In some aspects, a machine learning model may be used to estimate the probability as to whether a given pixel should be removed or if the pixel needs to remain. In some implementations, a neural network may be trained to identify what content to mask and what content to extract.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Content Data: as used herein refers to data and information input by a user or system. In some aspects, content data may be inserted based on the background data, such as in response to a prompt on a form or document. Content data may be integrated into a form automatically or manually, such as by hand, through use of a computer, through use of a device, or combinations thereof. Content data may comprise character images, handwritten font, type font, stampings, embossment, and combinations thereof, as non-limiting examples. In some aspects, character images may include characters, symbols, graphics, illustrations, markings, other notations, and combinations thereof.

Form: as used herein refers to any document comprising background data and content data. In some aspects, forms may comprise one or more paper forms, signs, computer/device screens, labels, and electronic documents (such as word processing documents, portable document format documents, or image files, as non-limiting examples). As non-limiting examples, a form may comprise a tax form, such as a 1095, a financial document, such as a mortgage application, a healthcare form, such as a physician intake form, or an insurance form, such as a claims form. In some aspects, a form may comprise an image with background data and content data. For example, a form may comprise a license plate, wherein the content data may comprise the license plate number and date of expiration and the background data may comprise the state, slogan, and graphic that may indicate the exact type of plate.

Data: as used herein refers to extractable information from a form, wherein data may comprise a combination of content data and background data. In some aspects, data may comprise information not yet processed, categorized, or indexed.

Noise: as used herein refers to aberrations on a form that does not comprise background data or content data.

Dropout: as used herein refers to a removal of background data, wherein the remaining data may comprise content data. In some aspects, the dropout may occur after a removal of noise, which may allow for a more precise removal of background data.

User: as used herein refers to any entity that may insert or input content data. In some aspects, a user may comprise an individual who may be inputting content data on behalf of herself or on behalf of another. In some embodiments, a user may comprise an artificial entity, such as software or artificial intelligence. In some implementations, multiple users may contribute to a single form, whether authentic or synthetic. In some aspects, the multiple users may input the data at the same or different times, location, or entities.

Background Data: as used herein refers to data and information on a form that may be universal to that form, such as form prompts and general form information, as non-limiting examples. In some aspects, general form information may comprise form identification, including form numbers or information related to the source, such as the government entity or company providing the form. In some embodiments, general form information may comprise page numbers or disclaimers that may be included with the form. In some implementations, prompts may comprise text or images that indicate to a user what content to insert in which locations on the form, such as name, date, address, or other requested information.

Artificial Entity: as used herein refers to any computer-implementing mechanism, such as artificial intelligence, machine learning algorithms, statistical algorithms, or rules-based system, as non-limiting examples.

Element: as used herein refers to a small unit of an image that may be individually processed, wherein an image refers to any combination of form data and the form. For example, an element may comprise a pixel, super pixel, or voxel, as non-limiting examples.

Category: as used herein refers to tagging or classifying content data and background data based on predefined characteristics and parameters. Categorization refers to assigning a category to at least a portion of the content data or background data. In some aspects, a category may be a general type, such as sensitive or not sensitive or hand input or computer input. Sensitive data may include credit card information, social security numbers, or health information, as non-limiting examples. In some embodiments, a category may be a specific type, such as address, date, insurance code, or VIN, as non-limiting examples. In some implementations, the specific types may be further distinguished, such as identifying a birth date from a form completion date or identifying a health care provider name from a patient name from a guardian's name from a claims adjuster name. In some aspects, categorization may be based on isolated element analysis, context of proximate elements, comparisons of background data to content data, or combinations thereof, as non-limiting examples. In some aspects, background data may be indexed to allow for faster processing, wherein portions of background data may be labeled, such as by form field.

Indexing: as used herein refers to assigning or tagging a form based on form type, such as by topic or specific form. In some aspects, indexing may allow for faster processing of at least a portion of one or both content data and background, as at least a portion of the form may have been mapped out based on already-processed data and forms. For example, a form may be indexed as a drivers license. The system may know that a drivers license contains at least a name, address, state, and license number. The form may be further identified as a New York drivers license, which may indicate five different mapping options, such as based on the age of the driver and the issue date of the drivers license. The form may be further indexed as issued in 1993, which may identify the precise locations and categories of content data and background data.

Form Type: as used herein refers to a form identifier, such as a form topic or specific form number. In some aspects, background data may be indexed as a form type. In some embodiments, authentic or synthetic forms as whole may be indexed as a form type, wherein it may not be required to isolate the background data from content data to be indexed by form type.

Figure 1:
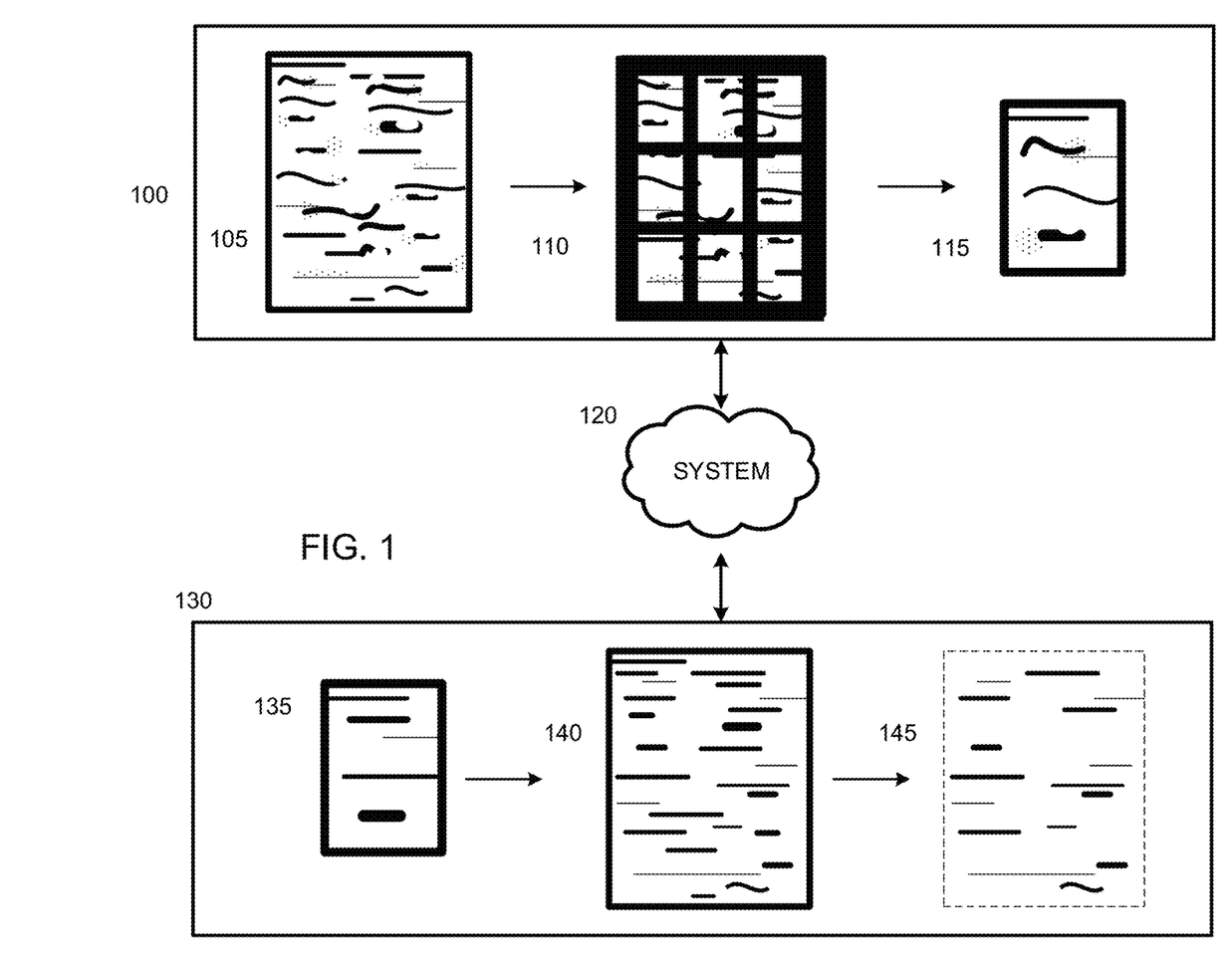
FIG. 1 illustrates exemplary document processing steps, wherein the development steps may be used to dropout background data from content data.

Referring now to FIG. 1, exemplary document processing steps are illustrated, wherein the development steps may be used to dropout background data from content data. In some embodiments, at 100, an authentic form may be preprocessed. In some aspects, at 105, an authentic form may be received or accessed. In some embodiments, at 110, the authentic form may be segmented, and at 115, each segment may be isolated for analysis. At 120, each segment may be processed through an artificial intelligence, such as machine learning.

In some implementations, at 130, the segments may be processed to remove background data and assemble the authentic data. In some aspects, at 135, each segment may be analyzed, wherein noise, background data, and content data may be separately identified in each segment. In some aspects, noise may be removed from the segments. In some aspects, noise may comprise white randomized pixels to the form and data. In some implementations, noise may comprise translated data pixels. In some embodiments, noise may comprise removing sections of the horizontal and vertical form region lines. In some aspects, noise may comprise a deformed synthetic form, such as elastic transformations and skewing. In some implementations, noise may comprise random horizontal and vertical lines to the form.

In some embodiments, noise may comprise a zoomed in or out copy of a synthetic form, such as a section enlargement or a portion of a document. In some aspects, noise may comprise a changed aspect ratio of the synthetic form. In some embodiments, noise may comprise random pixels within the synthetic form, such as black pixels, grayscale, or combinations thereof, as non-limiting examples. In some implementations, noise may comprise a dilated synthetic form, eroded synthetic form, or combinations thereof.

In some aspects, the processing may analyze a segment by pixel, wherein the analysis may determine whether a pixel is noise or part of the background data or content data. In some embodiments, the analysis may determine whether the pixel is in the correct location or state, which may not be true if the pixel is in a skewed, deformed, or translated portion of the form, as non-limiting examples. In some implementations, where the pixel is determined to be part of the background data or content data, the system may leave the pixel in the segment. The pixel may be left in the same position and state, if it is in the correct location or state, or may be adjusted to the correct location and state. Where the pixel may be deemed noise, the system may remove all or part of the pixel.

In some embodiments, at 140, the segments may be reassembled, and at 145, the background data may be dropped out, wherein the content data may remain. In some implementations, the background data may be dropped out prior to reassembly. In some aspects, it may be useful to include the background data in the reassembled document, particularly where an entity may want to refer back to a clean form with the authentic data.

In some aspects, the system and method may be color and form agnostic for performing form dropouts, specifically without the need for input of form characteristics. In some implementations, this methodology may allow for more accurate OCR/ICR for reading forms by training the scanning mechanism to simulate a background, drop out the background, and scanning text through machine learning techniques. In some embodiments, the system may learn to distinguish a form's background from form contents without requiring input of form characteristics or identifying what may not be considered standard text.

Figure 2:
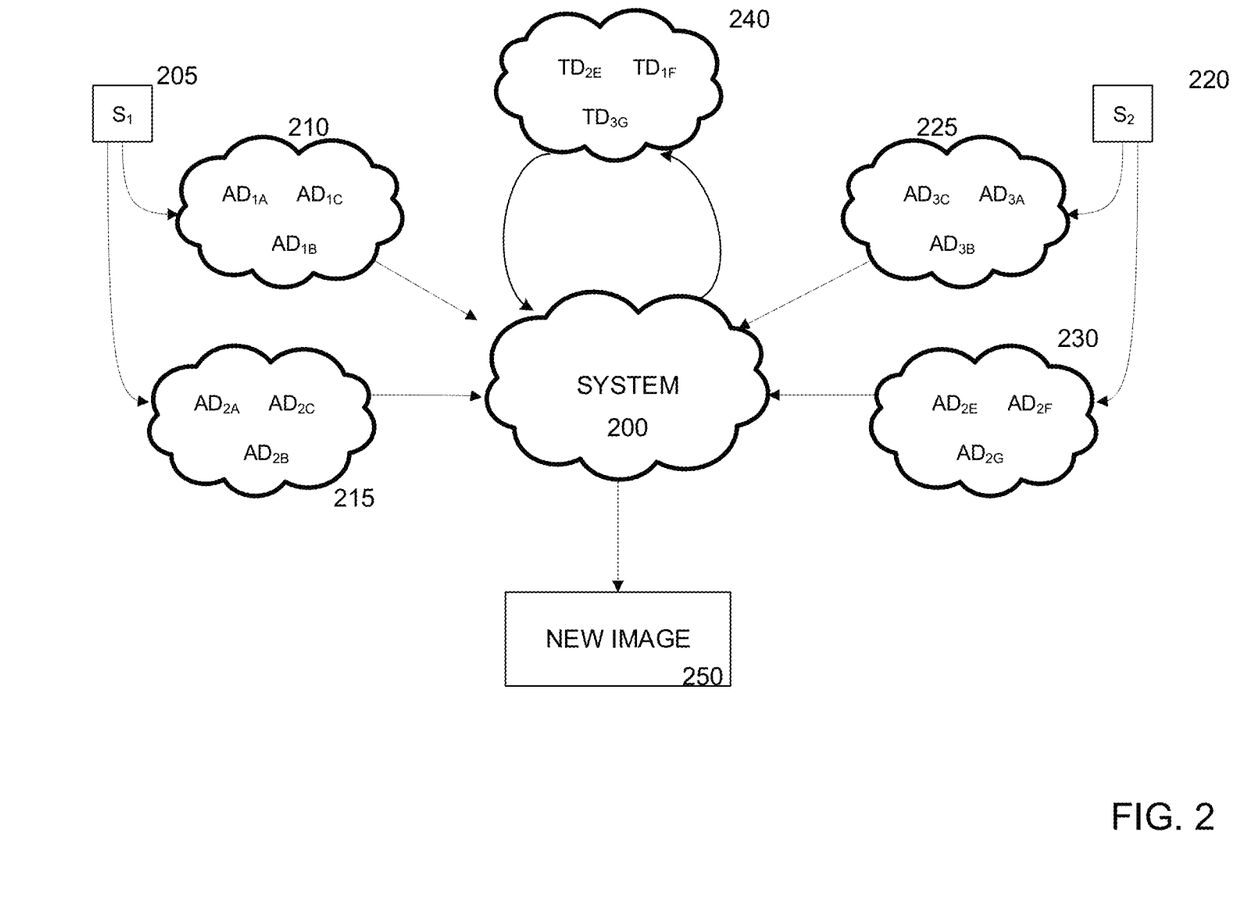
FIG. 2 illustrates an exemplary system flow chart, according to some embodiments of the present invention.

Referring now to FIG. 2, an exemplary system flow chart is illustrated. In some aspects, a first source 205 may use two forms, wherein a set of authentic data 210, 215 for each form may be sent to the system 200. In some embodiments, a second source 220 may use two forms, wherein a set of authentic data 225, 230 for each form may be sent to the system. In some implementations, the first source 205 and the second source 220 may use some of the same forms, wherein a set of authentic data 215 from the first source 205 and a set of authentic data 230 from the second source 220 may pertain to the same form.

In some embodiments, particularly where the sample size for a form may be limited, training data may be developed synthetically, wherein synthetic data related to one or more forms may be incorporated into the training data 240. In some aspects, training data 240 may be used as information for the system 200 to effectively remove noise and identify and separate content data from background data. In some implementations, authentic forms that may be processed through the system 200 may be integrated into the training data, which may allow the system 200 to increase its accuracy and precision over time.

In some embodiments, the system 200 may produce a new image 250. In some implementations, a new image 250 may be a variety of formats or file extensions. In some aspects, a new image 250 may be prepared for use with OCR/ICR. In some embodiments, the new image 250 may comprise one or both processed content data and background data. In some implementations, a form may be processed using training data to create an indexed form. Forms identified as the indexed form may require less processing, as the background data may be indexed with the indexed form.

In some embodiments, the system 200 may utilize an algorithm model, such as machine learning. As other examples, the algorithm model may comprise generalized linear models, support vector machines, nearest neighbor, decision trees, boosted or bagged decision trees, ensemble methods, Boltzmann machines, auto encoders, or neural networks. In some aspects, the system 200 may utilize a combination of algorithm models.

Figure 3:
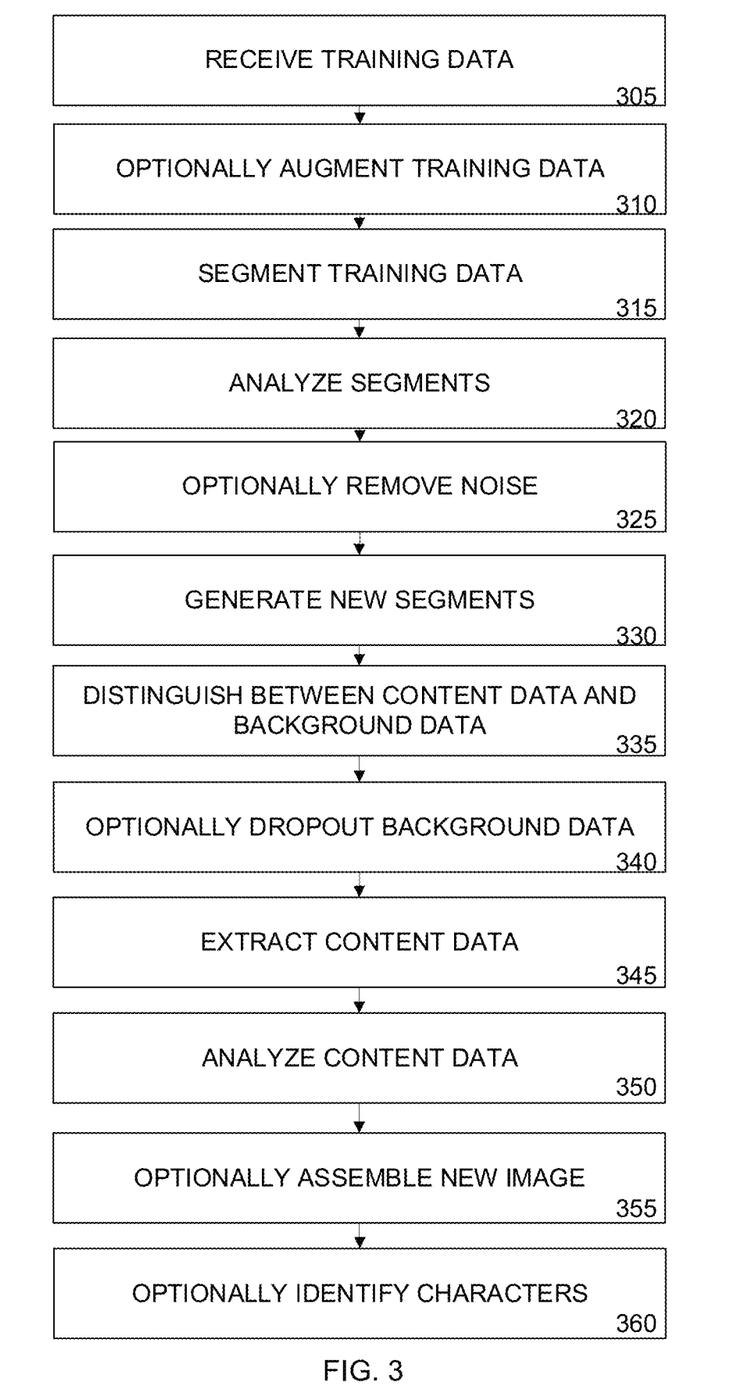
FIG. 3 illustrates exemplary method steps for dropping out background data from content data, according to some embodiments of the present invention.

Referring now to FIG. 3, exemplary method steps for dropping out background data from content data are illustrated. At 305, training data may be received, wherein the training data may comprise one or both authentic data and synthetic data. In some aspects, at 310, a portion of the training data may be augmented, wherein synthetic data and synthetic forms may be generated and integrated into the training data. At 315, forms in the training data may be segmented, wherein each segment may be mapped out. At 320, segments may be analyzed, wherein noise, background data, and content data may be separately identified in each segment.

In some aspects, at 325, noise may be removed from each segment. Noise may include "salt and pepper," markings that obscure a document or make a document harder to read, overlap between content data and background data, overlap between content data, and document skewing, as non-limiting examples. In some aspects, document skewing may occur from faxing or scanning, wherein the skewing may be exacerbated as documents are repeatedly scanned, printed, faxed, or combinations thereof.

At 330, new segments may be generated, wherein the new segments may comprise content data, background data, or combinations. At 335, content data may be distinguished from background data. In some aspects, content data may comprise one or more typed data, handwritten data, machine-print data, or digitally-entered data, as non-limiting examples. For example, a form may be partially filled in by populating data from a database and then further completed manually, such as using one or both handwritten data and typed data.

In some implementations, at 340, background data may be dropped out from the segments. At 345, content data may be extracted, and at 350, the content data may be analyzed. In some aspects, dropped out background data may be reassembled separately to create a blank form, which may be indexed and potentially utilized for other processed forms that may comprise the same background data.

In some implementations, indexing may distinguish between form types, such as by general topic or specific form numbers, as non-limiting examples. For example, indexing may identify the background data as a tax form; it may also be identified as form 1040. Indexing background data may allow for more efficient recognition and processing, as the location and type of at least a portion of one or both background data and content data may be known.

In some embodiments, at 355, a new image may be assembled. The new image may comprise a dropped-out version of the form where only content data remains. In some aspects, this may be useful if the form may need to be reprocessed in the future, such as to a different department or for a different purpose. The new image may comprise a distinctly separated form with both background and content data, which may be useful where the form may be revisited, such as by another person. This may not be necessary where the extracted content data is categorized, indexed, and stored. In some implementations, the assembly may be a delayed step where the new image may be assembled on demand, such as on a need basis when a relevant matter may benefit from "reading" the content data. In some aspects, at 360, characters of the assembled document may be identified, such as through OCR/ICR.

In some embodiments, the content data may be categorized, such as by information type, field, or input type. In some aspects, certain categories of data may be more effectively processed or recognized if done separately by unique artificial entities. For example, hand-written content and machine print content may be better processed separately, as recognition software may be handwriting or type specific. In some implementations, categorization of content data may create separable layers, wherein separation of layers may allow for separate processing and recognition.

In some aspects, categorization may distinguish between text content data and image content data. For example, categorization may allow for the separation of text, stamped dates, and barcodes, which may require different recognition techniques or products to properly process the form and data. In some implementations, the detail of categorization may depend on the form, form type, content data, background data, user preferences, or processing limitations, as non-limiting examples.

For example, a user may only want to know the dates of submission, which are stamped on the form, so the data may be categorized as date stamps or not date stamps. As another example, computational requirements of processing millions of forms into ten layers may be cost prohibitive to a user. As another example, a form may only allow for typed input of content data, so separating a layer of handwritten data may not be necessary.

In some embodiments, an artificial entity may be able to label each element as content data, background data, neither, or both. In some aspects, the same artificial entity may be able to categorize the content data, index the background data, or both. In some implementations, multiple artificial entities may be needed to effectively process forms and data. For example, an artificial entity that identifies content data and background data may be a different artificial entity that removes the content data or background data. In some aspects, separate artificial entities may be trained on the same or different sets of training data.

In some implementations, unique artificial entities may be used for different applications, such as based on form types, content data, background data, method of form transmission, indexing, or categorization, as non-limiting examples. For example, forms transmitted through fax may be processed through a different artificial entity than forms only transmitted online.

Figure 4A:
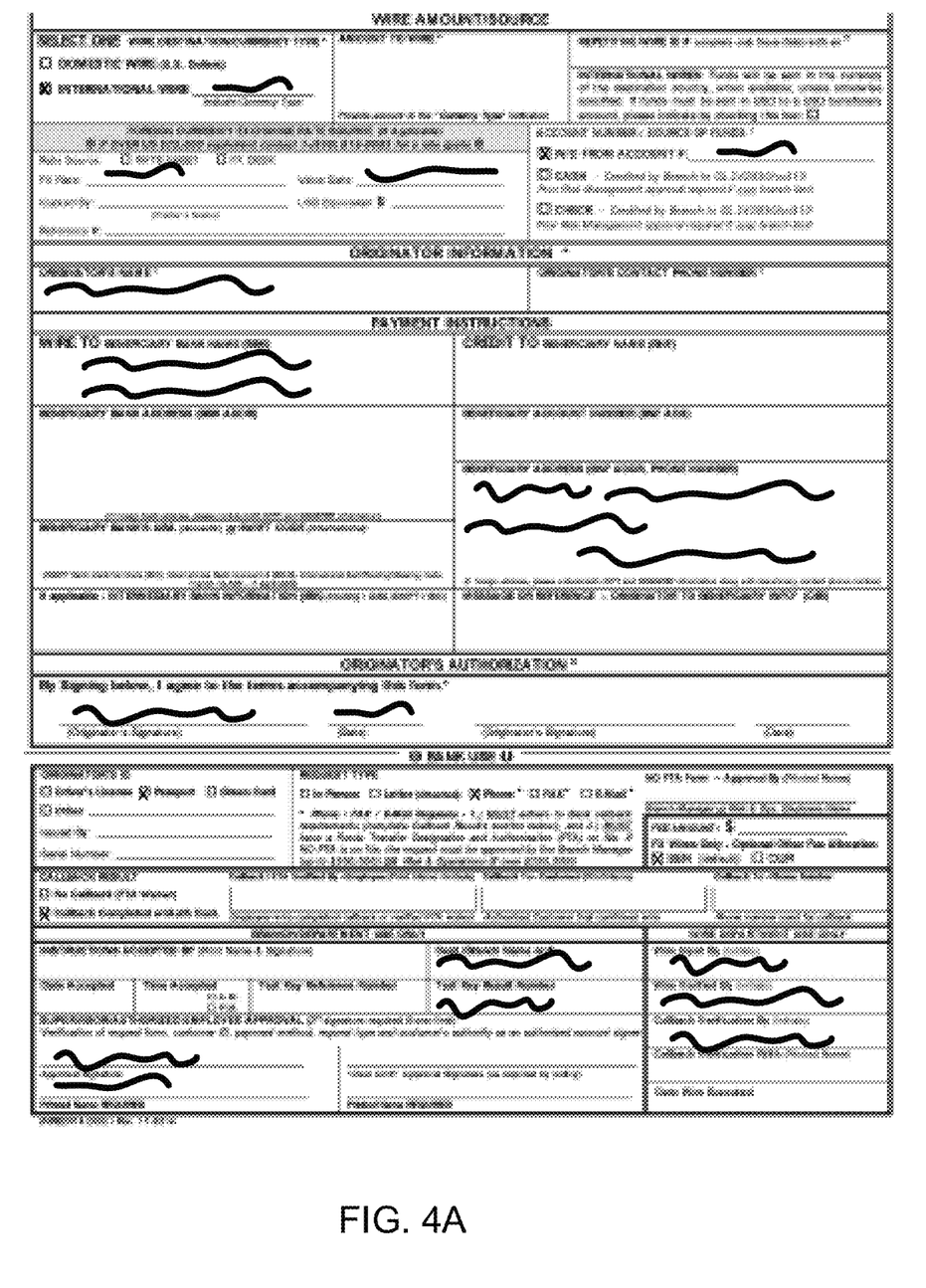
FIG. 4A illustrates exemplary document development steps for dropping out background data, according to some embodiments of the present invention.
Figure 4B:
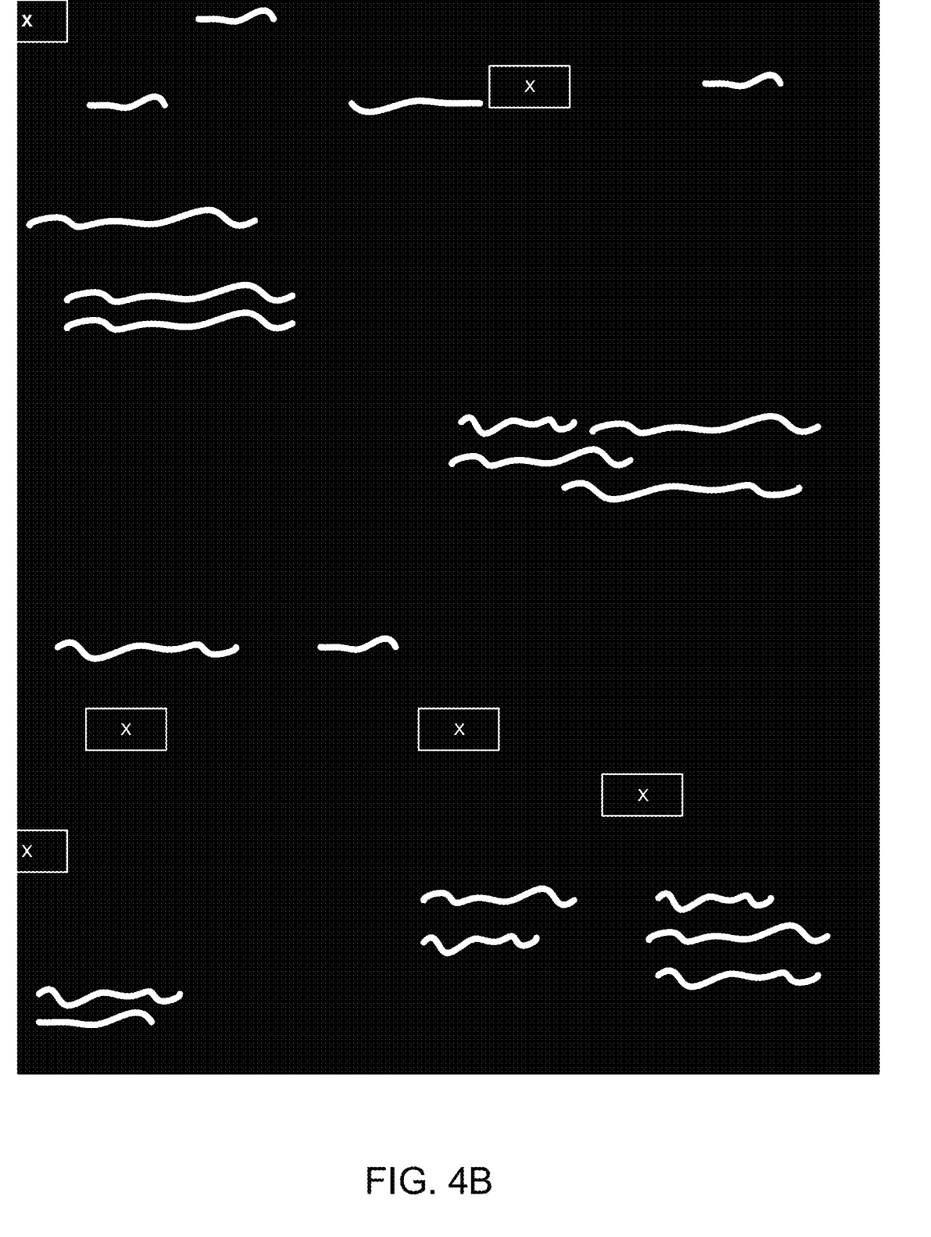
FIG. 4B illustrates exemplary document development steps for dropping out background data, according to some embodiments of the present invention.
Figure 4C:
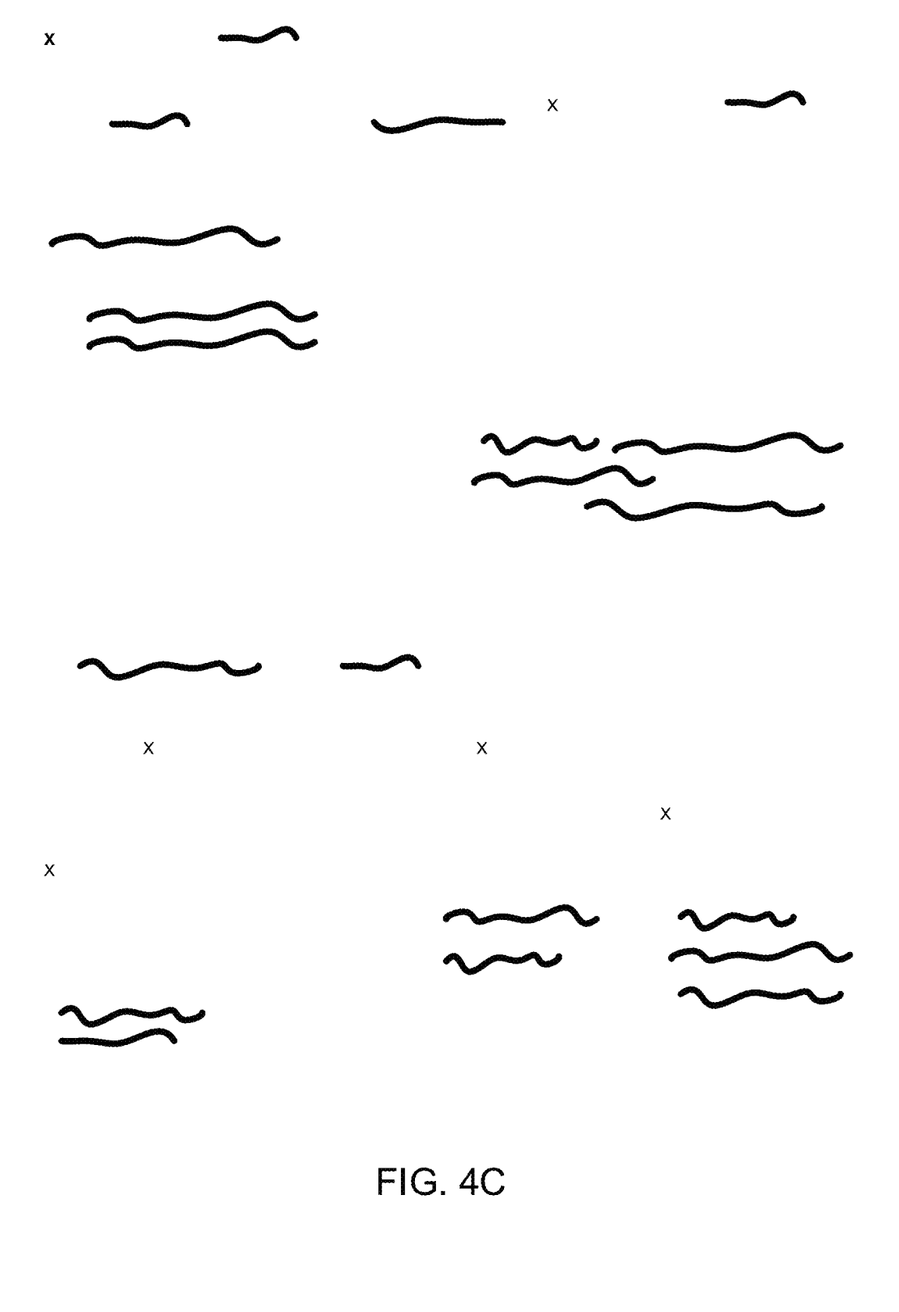
FIG. 4C illustrates exemplary document development steps for dropping out background data, according to some embodiments of the present invention.

Referring now to FIGS. 4A-4C, exemplary document development steps for dropping out background data are illustrated. FIG. 4A illustrates an exemplary authentic form comprising authentic content data. FIG. 4B illustrates exemplary content regions highlighted, wherein content regions may identify areas that may potentially contain content data. FIG. 4C illustrates an exemplary assembled document with content data only and background data dropped out or removed.

In some embodiments, content data may be transferred onto a clean form. In some implementations, content data may be prepped for OCR/ICR. In some aspects, background data may be generated for content data. In some aspects, missing elements may be painted in, wherein the inpainting increases a legibility of one or both background data or content data. For example, portions of text may have blank gaps, and the inpainting may complete the text. In some embodiments, content data may be isolated or stored for future use. In some implementations, content data may be analyzed to determine whether the correct form was used. In some aspects, the system may indicate whether content data is missing or is necessary for future processing. In some embodiments, one or both direct instructions and the training data may identify required form input sections, such as name, income, or social security number, as non-limiting examples.

Figure 5:
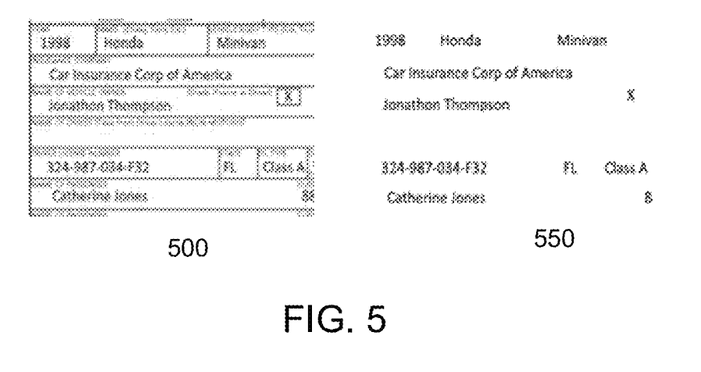
FIG. 5 illustrates exemplary document development steps for dropping out background data, according to some embodiments of the present invention.

Referring now to FIG. 5, exemplary document development steps for dropping out background data are illustrated. In some aspects, a form segment 500 may comprise background data and content data, wherein the background data may be identified and grouped as a mask that may be removed and added throughout the process. In some embodiments, removal of the mask may drop out the background data leaving the content data in isolation. In some implementations, during reassembly, the content data may be replaced in the same location as it was in the original form. In some embodiments, the content data may be translated, wherein at least a portion of the pixels of content data may be shifted along one or both the x axis and the y axis. In some aspects, noise may be removed from the content data. In some implementations, specific aspects may be identified to form part of the mask.

Figure 6:
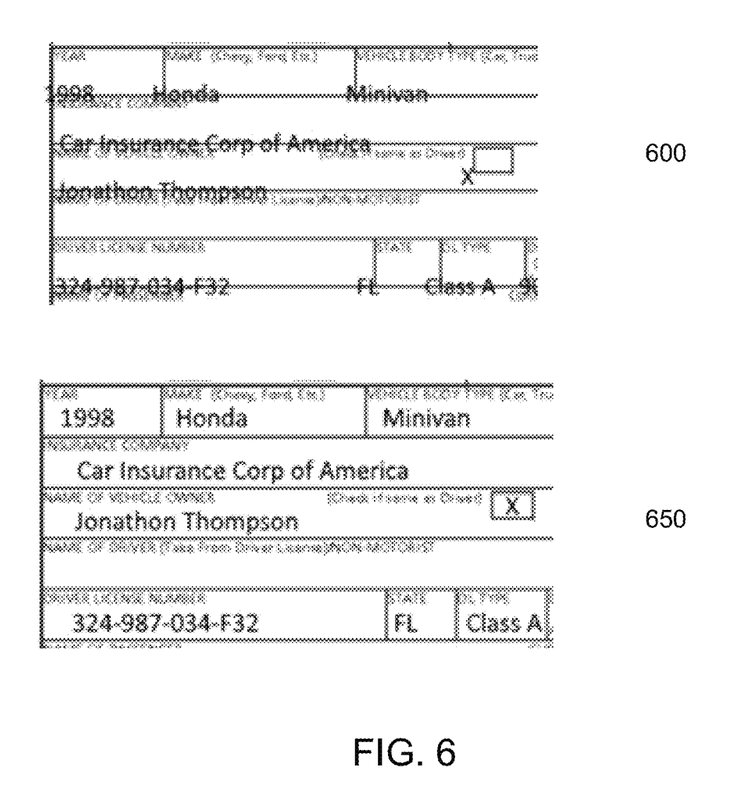
FIG. 6 illustrates document development steps for translating content data to shift pixels of content data into a different location within a form.

Referring now to FIG. 6, exemplary document development steps for translating content data to shift pixels of content data into a different location within the form are illustrated. In some embodiments, a pre-processed form segment 600 may comprise content data that may not be properly aligned and may overlap with the background data, which may limit the ability of OCR/ICR tools to recognize the content data as text.

Many OCR/ICR systems have templates that are used to tell the system where each of the fields is located. For example, there may be a map for a form that may prompt the OCR/ICR tool to start looking at coordinate (such as 200, 300 by way of example) to look for the field of type 'NAME OF DRIVE'. In some aspects, OCR/ICR pipelines may have issues with this approach due to the sensitivity to the data entry being within the predefined templates window for each field.

A typical OCR/ICR pipeline would most likely fail to extract meaningful text from the pre-processed form segment 600. In some embodiments, the system may create a translated segment 650, wherein the content data may be repositioned into the proper locations, which may fit into the OCR/ICR templates to allow the OCR/ICR to run properly.

Referring now to FIGS. 7A-7F, exemplary process steps for a form dropout are illustrated. In some aspects, such as in FIG. 7A, regions of data 705 in a form segment 710 may be identified, wherein the regions of data 705 may comprise content data. In some embodiments, the regions of data 705 may be processed. In some implementations, such as in FIG. 7B, the dropout output 720 may be extracted and separated from the form 710.

Figure 7A:
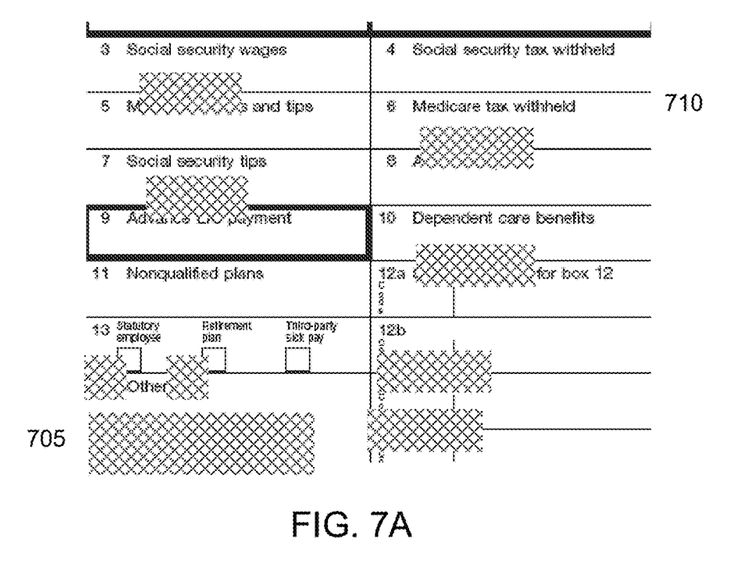
FIG. 7A illustrates identified regions of data within an exemplary form segment, according to some embodiments of the present invention.
Figure 7B:
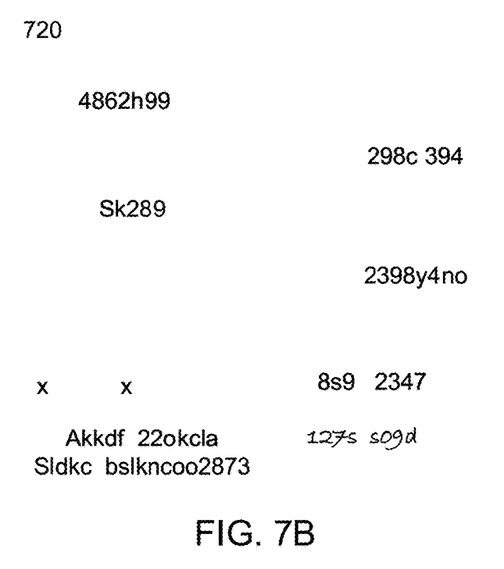
FIG. 7B illustrates an exemplary dropout output, according to some embodiments of the present invention.
Figure 7C:
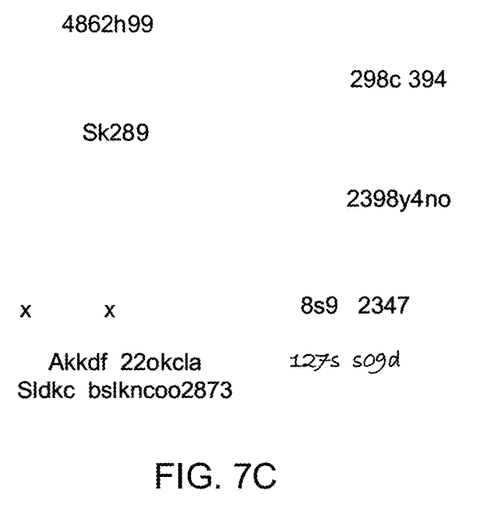
FIG. 7C illustrates an exemplary translated dropout output, according to some embodiments of the present invention.

In some aspects, the dropout output 720 may be translated, such as described and illustrated in FIGS. 6 and 7C, wherein the translation may place the content data in service lines within the form 710. In some implementations, the content data may be placed within the OCR/ICR tool's predefined template map. In some embodiments, such as illustrated in FIG. 7E, the reassembled form segment 750 may have more legible content data than the original form segment 740, such as illustrated in FIG. 7D. In some aspects, the dropout output 720 and the reassembled form segment 750 may be analyzed with an OCR/ICR tool. Prior to the translation, OCR/ICR engines and corresponding claim maps may miss the content data.

Figure 8:
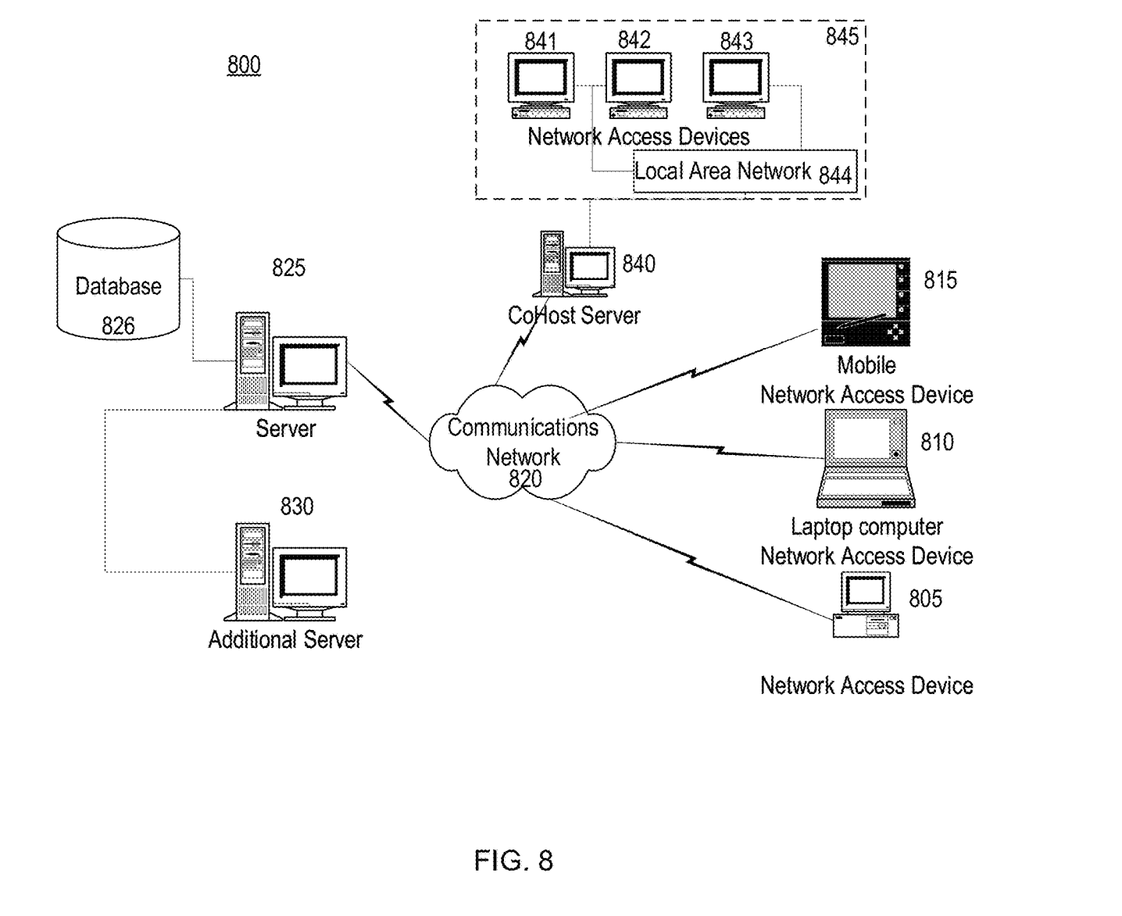
FIG. 8 illustrates an exemplary processing and interface system, according to some embodiments of the present invention.

Referring now to FIG. 8, an exemplary processing and interface system 800 is illustrated. In some aspects, access devices 815, 810, 805, such as a paired portable device 815 or laptop computer 810 may be able to communicate with an external server 825 though a communications network 820. The external server 825 may be in logical communication with a database 826, which may comprise data related to identification information and associated profile information. In some embodiments, the server 825 may be in logical communication with an additional server 830, which may comprise supplemental processing capabilities.

In some aspects, the server 825 and access devices 805, 810, 815 may be able to communicate with a cohost server 840 through a communications network 820. The cohost server 840 may be in logical communication with an internal network 845 comprising network access devices 841, 842, 843 and a local area network 844. For example, the cohost server 840 may comprise a payment service, such as PayPal or a social network, such as Facebook.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure. Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A process for processing and identifying content in a form, the process comprising the steps of:
   receiving a form set comprising a plurality of data sets, wherein each of the plurality of data sets populate at least a first form in the form set, and wherein each form in the form set and each data set in the plurality of data sets comprises a plurality of elements;
   processing at least a portion of the form set and a portion of the plurality of data sets that populate the portion of the form set through a first artificial entity; and
   identifying any combination of one or more noise, background data, and content data without character recognition for each form in the portion of the form set and the portion of the plurality of data sets, wherein the identifying labels each element of the portion of the form set and the portion of the plurality of data sets as at least one of noise, background data, or content data.

2. The process of claim 1, wherein processing comprises the steps of:
   segmenting each form in the portion of the form set, wherein the identifying occurs for each segment; and
   reassembling each form in the portion of the form set.

3. The process of claim 1, wherein the plurality of data sets comprises one or both synthetic data and authentic data.

4. The process of claim 1, wherein the form set comprises one or both synthetic forms and authentic forms.

5. The process of claim 1, wherein the form set comprises a plurality of form types, and the process further comprises identifying a plurality of form types for at least the portion of the form set.

6. The process of claim 1, further comprising the process step of inpainting missing elements, wherein the inpainting increases a legibility of one or both background data or content data.

7. The process of claim 1, further comprising the step of removing the content data for each form in the portion of the form set and the portion of the plurality of data sets.

8. The process of claim 7, wherein removing the content data prepares each form in the portion of the form set and the portion of the plurality of data sets for recognition of the background data.

9. The process of claim 7, wherein the removing occurs through a second artificial entity.

10. The process of claim 1, further comprising the step of removing the background data for each form in the portion of the form set and the portion of the plurality of data sets.

11. The process of claim 10, wherein removing the background data prepares each form in the portion of the form set and the portion of the plurality of data sets for recognition of the content data.

12. The process of claim 10, wherein the removing occurs through a second artificial entity.

13. The process of claim 1, further comprising the process step of categorizing at least a portion of the content data.

14. The process of claim 13, wherein the categorizing occurs through a second artificial entity.

15. The process of claim 13, wherein categorizing creates separable layers that, when separate, allows for increased recognition of at least a portion of the content data.

16. The process of claim 1, wherein at least some of one or both the background data and the form set are indexed, wherein indexing associates at least one form type with the portion of one or both the background data and the form set.

17. The process of claim 16, further comprising the process step of indexing a first portion of one or both the background data and the form set.

18. The process of claim 17, wherein the indexing occurs through a second artificial entity.

19. The process of claim 17, wherein the indexing occurs through the first artificial entity.

* * * * *